US011749137B2

(12) United States Patent
Savitsky et al.

(10) Patent No.: US 11,749,137 B2
(45) Date of Patent: *Sep. 5, 2023

(54) SYSTEM AND METHOD FOR MULTISENSORY PSYCHOMOTOR SKILL TRAINING

(71) Applicant: SonoSim, Inc., Santa Monica, CA (US)

(72) Inventors: Eric A. Savitsky, Santa Monica, CA (US); Gabriele Nataneli, Beverly Hills, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 17/150,719

(22) Filed: Jan. 15, 2021

(65) Prior Publication Data
US 2021/0134186 A1 May 6, 2021

Related U.S. Application Data

(63) Continuation of application No. 15/880,290, filed on Jan. 25, 2018, now Pat. No. 10,896,628.
(Continued)

(51) Int. Cl.
G09B 23/28 (2006.01)
G09B 9/00 (2006.01)
(52) U.S. Cl.
CPC ............ G09B 23/286 (2013.01); G09B 9/00 (2013.01)
(58) Field of Classification Search
CPC .... G09B 23/28; G09B 23/285; G09B 23/286; G09B 23/30
See application file for complete search history.

(56) References Cited

U.S. PATENT DOCUMENTS

| 1,488,233 A | 3/1924 | Diehl |
| 1,762,937 A | 6/1930 | Staud |

(Continued)

FOREIGN PATENT DOCUMENTS

| EP | 1103223 | 5/2001 |
| EP | 2801966 | 11/2014 |

(Continued)

OTHER PUBLICATIONS

Simsuite, "Are you ready for your first carotid stent procedure/begin preparing now," www.simsuites.com/readarticie.asp?articleId=598, 1 pg, obtained from website Nov. 25, 2004.
(Continued)

Primary Examiner — Robert J Utama
(74) Attorney, Agent, or Firm — Cislo & Thomas, LLP

(57) ABSTRACT

A system and method for delivering psychomotor skill training, providing didactic instruction using an internet portal, tracking performance, and providing user feedback within a multisensory environment, serving as an integration for existing multimodal ultrasound training systems. This multisensory psychomotor skill training environment of the present invention would extend the existing described patented technologies by further adding realism through representation of virtual (digital) characters into a training scenario (e.g., pregnant patient), superimposing virtual (digital) guides or prompts onto actual real physical objects (e.g., anatomical landmarks or guides onto a mannequin or patient) embedding the training instruments within a broader virtual (digital) scenario (e.g., operating room). The ability to create these virtual, augmented, and mixed reality scenarios enables cost-effective, realistic, and improved training capabilities that mirror real-life training scenarios.

19 Claims, 1 Drawing Sheet

Related U.S. Application Data

(60) Provisional application No. 62/450,975, filed on Jan. 26, 2017.

(56) References Cited

U.S. PATENT DOCUMENTS

| | | |
|---|---|---|
| 2,019,121 A | 10/1935 | De Rewal |
| 2,112,019 A | 3/1938 | Gyger |
| 2,127,610 A | 8/1938 | Moore |
| 2,705,049 A | 3/1955 | Brooks |
| 2,705,307 A | 3/1955 | Nyswander |
| 2,722,947 A | 11/1955 | Sragal |
| 2,886,316 A | 5/1959 | Ayala |
| 4,040,171 A | 8/1977 | Cline et al. |
| 4,838,863 A | 6/1989 | Allard et al. |
| 4,838,869 A | 6/1989 | Allard |
| 4,994,034 A | 2/1991 | Botich et al. |
| 5,231,381 A | 7/1993 | Duwaer |
| 5,513,992 A | 5/1996 | Refait |
| 5,609,485 A | 3/1997 | Bergman et al. |
| 5,678,565 A | 10/1997 | Sarvazyan |
| 5,689,443 A | 11/1997 | Ramanathan |
| 5,701,900 A | 12/1997 | Shehada et al. |
| 5,704,791 A | 1/1998 | Gillio |
| 5,755,577 A | 5/1998 | Gillio |
| 5,767,839 A | 6/1998 | Rosenberg |
| 5,776,062 A | 7/1998 | Nieids |
| 5,791,908 A | 8/1998 | Gillio |
| 5,800,177 A | 9/1998 | Gillio |
| 5,800,178 A | 9/1998 | Gillio |
| 5,800,179 A | 9/1998 | Bailey |
| 5,800,350 A | 9/1998 | Coppleson et al. |
| 5,827,942 A | 10/1998 | Madsen et al. |
| 5,882,206 A | 3/1999 | Gillio |
| 5,889,237 A | 3/1999 | Makinwa |
| 5,934,288 A | 8/1999 | Avila et al. |
| 6,001,472 A | 12/1999 | Ikeda et al. |
| 6,048,312 A | 4/2000 | Ishrak et al. |
| 6,063,030 A | 5/2000 | Vara et al. |
| 6,068,597 A | 5/2000 | Lin |
| 6,074,213 A | 6/2000 | Hon |
| 6,113,395 A | 9/2000 | Hon |
| 6,117,078 A | 9/2000 | Lysyansky et al. |
| 6,122,538 A | 9/2000 | Sliwa, Jr. et al. |
| 6,156,213 A | 12/2000 | Dudley et al. |
| 6,193,657 B1 | 2/2001 | Drapkin |
| 6,267,599 B1 | 7/2001 | Bailey |
| 6,468,212 B1 | 10/2002 | Scott et al. |
| 6,502,756 B1 | 1/2003 | Fåhraeus |
| 6,511,427 B1 | 1/2003 | Sliwa, Jr. et al. |
| 6,548,768 B1 | 4/2003 | Pettersson et al. |
| 6,570,104 B1 | 5/2003 | Ericson et al. |
| 6,654,000 B2 | 11/2003 | Rosenberg |
| 6,663,008 B1 | 12/2003 | Pettersson et al. |
| 6,665,554 B1 | 12/2003 | Charles et al. |
| 6,666,376 B1 | 12/2003 | Ericson |
| 6,667,695 B2 | 12/2003 | Pettersson et al. |
| 6,674,427 B1 | 1/2004 | Pettersson et al. |
| 6,689,966 B2 | 2/2004 | Wiebe |
| 6,693,626 B1 | 2/2004 | Rosenberg |
| 6,694,163 B1 | 2/2004 | Vining |
| 6,698,660 B2 | 3/2004 | Fåhraeus et al. |
| 6,714,213 B1 | 3/2004 | Lithicum et al. |
| 6,714,901 B1 | 3/2004 | Cotin et al. |
| 6,719,470 B2 | 4/2004 | Berhin |
| 6,722,574 B2 | 4/2004 | Skantze et al. |
| 6,732,927 B2 | 5/2004 | Olsson et al. |
| 6,750,877 B2 | 6/2004 | Rosenberg et al. |
| 6,780,016 B1 | 8/2004 | Toly |
| 6,816,148 B2 | 11/2004 | Mallett et al. |
| 6,836,555 B2 | 12/2004 | Ericson et al. |
| 6,854,821 B2 | 2/2005 | Ericson et al. |
| 6,864,880 B2 | 3/2005 | Hugosson et al. |
| 6,878,062 B2 | 4/2005 | Bjorklund et al. |
| 6,896,650 B2 | 5/2005 | Tracey et al. |
| 6,916,283 B2 | 7/2005 | Tracey et al. |
| 6,927,916 B2 | 8/2005 | Craven-Bartle |
| 6,929,183 B2 | 8/2005 | Pettersson |
| 6,929,481 B1 | 8/2005 | Alexander et al. |
| 6,947,033 B2 | 9/2005 | Fåhraeus et al. |
| 6,958,747 B2 | 10/2005 | Sahlberg et al. |
| 6,966,495 B2 | 11/2005 | Lynggaard et al. |
| 6,992,655 B2 | 1/2006 | Ericson et al. |
| 7,002,559 B2 | 2/2006 | Ericson |
| 7,035,429 B2 | 4/2006 | Andreasson |
| 7,037,258 B2 | 5/2006 | Chatenever et al. |
| 7,050,653 B2 | 5/2006 | Edso et al. |
| 7,054,487 B2 | 5/2006 | Ericson et al. |
| 7,072,529 B2 | 7/2006 | Hugosson et al. |
| 7,089,308 B2 | 8/2006 | Fransson et al. |
| 7,094,977 B2 | 8/2006 | Ericson et al. |
| 7,110,604 B2 | 9/2006 | Olsson |
| 7,120,320 B2 | 10/2006 | Petterson et al. |
| 7,121,465 B2 | 10/2006 | Rignell |
| 7,127,682 B2 | 10/2006 | Sandstrom et al. |
| 7,143,952 B2 | 12/2006 | Ericson |
| 7,145,556 B2 | 12/2006 | Pettersson |
| 7,154,056 B2 | 12/2006 | Bergqvist et al. |
| 7,162,087 B2 | 1/2007 | Bryborn |
| 7,167,164 B2 | 1/2007 | Ericson et al. |
| 7,172,131 B2 | 2/2007 | Pettersson et al. |
| 7,175,095 B2 | 2/2007 | Pettersson et al. |
| 7,176,896 B1 | 2/2007 | Fahraeus et al. |
| 7,180,509 B2 | 2/2007 | Fermgard et al. |
| 7,195,166 B2 | 3/2007 | Olsson et al. |
| 7,202,861 B2 | 4/2007 | Lynggaard |
| 7,202,963 B2 | 4/2007 | Wiebe et al. |
| 7,239,306 B2 | 7/2007 | Fahraeus et al. |
| 7,246,321 B2 | 7/2007 | Bryborn et al. |
| 7,248,250 B2 | 7/2007 | Pettersson et al. |
| 7,249,256 B2 | 7/2007 | Hansen et al. |
| 7,249,716 B2 | 7/2007 | Bryborn |
| 7,254,839 B2 | 8/2007 | Fahraeus et al. |
| 7,278,017 B2 | 10/2007 | Skantze |
| 7,281,668 B2 | 10/2007 | Pettersson et al. |
| 7,283,676 B2 | 10/2007 | Olsson |
| 7,293,697 B2 | 11/2007 | Wiebe et al. |
| 7,295,193 B2 | 11/2007 | Fahraeus |
| 7,296,075 B2 | 11/2007 | Lynggaard |
| 7,321,692 B2 | 1/2008 | Bryborn et al. |
| 7,333,947 B2 | 2/2008 | Wiebe et al. |
| 7,345,673 B2 | 3/2008 | Ericson et al. |
| 7,353,393 B2 | 4/2008 | Hansen et al. |
| 7,356,012 B2 | 4/2008 | Wiebe et al. |
| 7,371,068 B2 | 5/2008 | Lloyd et al. |
| 7,382,361 B2 | 6/2008 | Burstrom et al. |
| 7,385,595 B2 | 6/2008 | Bryborn et al. |
| 7,408,536 B2 | 8/2008 | Hugosson et al. |
| 7,415,501 B2 | 8/2008 | Burstrom |
| 7,418,160 B2 | 8/2008 | Lynggaard |
| 7,422,154 B2 | 9/2008 | Ericson |
| 7,441,183 B2 | 10/2008 | Burstrom et al. |
| 7,457,413 B2 | 11/2008 | Thuveshoimen et al. |
| 7,457,476 B2 | 11/2008 | Olsson |
| 7,543,753 B2 | 6/2009 | Pettersson |
| 7,588,191 B2 | 9/2009 | Pettersson et al. |
| 7,600,693 B2 | 10/2009 | Pettersson |
| 7,649,637 B2 | 1/2010 | Wiebe et al. |
| 7,670,070 B2 | 3/2010 | Craven-Bartle |
| 7,672,513 B2 | 3/2010 | Bjorklund et al. |
| 7,701,446 B2 | 4/2010 | Sahlberg et al. |
| 7,710,408 B2 | 5/2010 | Ericson |
| 7,751,089 B2 | 7/2010 | Fahraeus et al. |
| 7,753,283 B2 | 7/2010 | Lynggaard |
| 7,777,777 B2 | 8/2010 | Bowman et al. |
| 7,788,315 B2 | 8/2010 | Johansson |
| 7,794,388 B2 | 9/2010 | Draxinger et al. |
| 7,806,696 B2 | 10/2010 | Alexander et al. |
| 7,833,018 B2 | 11/2010 | Alexander et al. |
| 7,850,454 B2 | 12/2010 | Toly |
| 7,857,626 B2 | 12/2010 | Toly |
| 7,871,850 B2 | 1/2011 | Park |
| 7,931,470 B2 | 4/2011 | Alexander et al. |
| 8,244,506 B2 | 8/2012 | Butsev et al. |
| 8,294,972 B2 | 10/2012 | Chung |

(56) References Cited

U.S. PATENT DOCUMENTS

| | | |
|---|---|---|
| 8,428,326 B2 | 4/2013 | Falk et al. |
| 8,480,404 B2 | 7/2013 | Savitsky |
| 8,480,406 B2 | 7/2013 | Alexander et al. |
| 8,556,635 B2 | 10/2013 | Siassi |
| 8,721,344 B2 | 5/2014 | Marmaropoulos et al. |
| 9,128,116 B2 | 9/2015 | Welch et al. |
| 9,251,721 B2 | 2/2016 | Lampotang |
| 9,436,993 B1 | 9/2016 | Stolka et al. |
| 9,870,721 B2 | 1/2018 | Savitsky et al. |
| 9,911,365 B2 | 3/2018 | Toly |
| 10,052,010 B2 | 8/2018 | Feddema |
| 10,132,015 B2 | 11/2018 | Woodruff et al. |
| 11,011,077 B2 | 5/2021 | Garcia Kilroy |
| 2001/0031920 A1 | 10/2001 | Kaufman et al. |
| 2002/0076581 A1 | 6/2002 | McCoy |
| 2002/0076681 A1 | 6/2002 | Leight et al. |
| 2002/0088926 A1 | 7/2002 | Prasser |
| 2002/0099310 A1 | 7/2002 | Kimchy et al. |
| 2002/0168618 A1 | 11/2002 | Anderson et al. |
| 2002/0173721 A1 | 11/2002 | Grunwald et al. |
| 2004/0043368 A1 | 3/2004 | Hsieh et al. |
| 2004/0087850 A1 | 5/2004 | Okerlund et al. |
| 2005/0119569 A1 | 6/2005 | Ohtake |
| 2005/0181342 A1 | 8/2005 | Toly |
| 2005/0214726 A1 | 9/2005 | Feygin et al. |
| 2005/0228617 A1 | 10/2005 | Kerwin et al. |
| 2005/0283075 A1 | 12/2005 | Ma et al. |
| 2006/0020204 A1 | 1/2006 | Serra et al. |
| 2006/0098010 A1 | 5/2006 | Dwyer et al. |
| 2007/0088213 A1 | 4/2007 | Poland |
| 2007/0161904 A1 | 7/2007 | Urbano |
| 2007/0232907 A1 | 10/2007 | Pelissier et al. |
| 2007/0233085 A1 | 10/2007 | Colvin et al. |
| 2007/0236514 A1 | 10/2007 | Augusanto |
| 2008/0009743 A1 | 1/2008 | Hayasaka |
| 2008/0137071 A1 | 6/2008 | Chow |
| 2008/0187896 A1 | 8/2008 | Savitsky |
| 2008/0200807 A1 | 8/2008 | Wright et al. |
| 2008/0204004 A1 | 8/2008 | Anderson |
| 2008/0269606 A1 | 10/2008 | Matsumura |
| 2008/0294096 A1 | 11/2008 | Uber et al. |
| 2008/0312884 A1 | 12/2008 | Hostettler et al. |
| 2009/0006419 A1 | 1/2009 | Savitsky et al. |
| 2009/0043195 A1 | 2/2009 | Poland |
| 2009/0046912 A1 | 2/2009 | Hostettler |
| 2009/0130642 A1 | 5/2009 | Tada et al. |
| 2009/0209859 A1 | 8/2009 | Tsujita et al. |
| 2009/0266957 A1 | 10/2009 | Cermak |
| 2009/0305213 A1 | 12/2009 | Burgkart et al. |
| 2009/0311655 A1 | 12/2009 | Karkanias et al. |
| 2010/0055657 A1 | 3/2010 | Goble et al. |
| 2010/0104162 A1 | 4/2010 | Falk et al. |
| 2010/0179428 A1 | 7/2010 | Pedersen et al. |
| 2010/0268067 A1 | 10/2010 | Razzaque et al. |
| 2010/0277422 A1 | 11/2010 | Muresianu et al. |
| 2011/0010023 A1 | 1/2011 | Kunzig et al. |
| 2011/0306025 A1 | 12/2011 | Sheehan et al. |
| 2012/0021993 A1 | 1/2012 | Kim et al. |
| 2012/0058457 A1 | 3/2012 | Savitsky |
| 2012/0143142 A1 | 6/2012 | Klein |
| 2012/0150797 A1 | 6/2012 | Landy et al. |
| 2012/0179039 A1 | 7/2012 | Pelissier et al. |
| 2012/0200977 A1 | 8/2012 | Nestler |
| 2012/0219937 A1 | 8/2012 | Hughes et al. |
| 2012/0237102 A1 | 9/2012 | Savitsky et al. |
| 2012/0237913 A1 | 9/2012 | Savitsky et al. |
| 2012/0238875 A1 | 9/2012 | Savitsky et al. |
| 2012/0251991 A1 | 10/2012 | Savitsky |
| 2013/0046523 A1 | 2/2013 | Van Dinther |
| 2013/0064036 A1 | 3/2013 | Lee et al. |
| 2013/0065211 A1 | 3/2013 | Amso et al. |
| 2013/0137989 A1 | 5/2013 | Chen |
| 2013/0158411 A1 | 6/2013 | Miyasaka |
| 2013/0179306 A1 | 7/2013 | Want et al. |
| 2013/0236872 A1 | 9/2013 | Laurusonis et al. |
| 2014/0000448 A1 | 1/2014 | Tepper |
| 2014/0087347 A1 | 3/2014 | Tracy |
| 2014/0114194 A1 | 4/2014 | Kanayama et al. |
| 2014/0119645 A1 | 5/2014 | Zimet |
| 2014/0120505 A1 | 5/2014 | Rios et al. |
| 2014/0170620 A1 | 6/2014 | Savitsky et al. |
| 2014/0228685 A1 | 8/2014 | Eelbode |
| 2014/0272878 A1 | 9/2014 | Shim et al. |
| 2015/0056591 A1 | 2/2015 | Tepper et al. |
| 2015/0073639 A1 | 3/2015 | Hausotte |
| 2015/0084897 A1 | 3/2015 | Nataneli et al. |
| 2015/0086956 A1 | 3/2015 | Savitsky et al. |
| 2015/0140538 A1 | 5/2015 | Savitsky et al. |
| 2015/0154890 A1 | 6/2015 | Savitsky |
| 2015/0213731 A1 | 7/2015 | Sato |
| 2016/0104393 A1 | 4/2016 | Savitsky et al. |
| 2016/0259424 A1 | 9/2016 | Nataneli et al. |
| 2016/0314715 A1 | 10/2016 | Savitsky et al. |
| 2016/0314716 A1 | 10/2016 | Grubbs |
| 2016/0328998 A1 | 11/2016 | Pedersen |
| 2017/0018204 A1 | 1/2017 | Savitsky et al. |
| 2017/0028141 A1 | 2/2017 | Fiedler et al. |
| 2017/0035517 A1 | 2/2017 | Geri |
| 2017/0046985 A1 | 2/2017 | Hendrickson et al. |
| 2017/0110032 A1* | 4/2017 | O'Brien ................. A61B 8/483 |
| 2017/0270829 A1 | 9/2017 | Bauss |
| 2017/0352294 A1 | 12/2017 | Nataneli et al. |
| 2018/0137784 A1 | 5/2018 | Savitsky |
| 2018/0197441 A1 | 7/2018 | Rios |
| 2018/0211563 A1 | 7/2018 | Savitsky |
| 2018/0330635 A1 | 11/2018 | Savitsky |
| 2018/0366034 A1 | 12/2018 | Casals Gelpi |
| 2019/0057620 A1 | 2/2019 | Eggert |
| 2019/0231436 A1 | 8/2019 | Panse |
| 2019/0321657 A1 | 10/2019 | Hale |
| 2019/0371204 A1 | 12/2019 | Savitsky |
| 2020/0126449 A1 | 4/2020 | Horst |
| 2020/0138518 A1 | 5/2020 | Lang |
| 2020/0242971 A1 | 7/2020 | Wang |
| 2020/0242972 A1 | 7/2020 | Petrinec |
| 2021/0128125 A1 | 5/2021 | Sitti et al. |
| 2021/0186311 A1 | 6/2021 | Levy et al. |

FOREIGN PATENT DOCUMENTS

| | | |
|---|---|---|
| JP | 2011097238 | 12/2014 |
| RU | 2127610 | 11/2014 |
| RU | 1994040171 | 11/2014 |
| WO | 2006060406 | 6/2006 |

OTHER PUBLICATIONS

NewRuleFX Brand 5ml Retractable Hypo Syringe Prop—Retractable Needle and Plunger—No Liquids. (Feb. 9, 2014), from https://www.newrulefx.com/products/newrulefx-brand-5ml-retractable-hypo-syringe-prop-retractable-needle-and-plunger-no-liquids?_pos=4&_sid=71f351469&_ss=r (Year: 2014).

Chung, Gregory, "Effects of Simulation-Based Practice on Focused Assessment . . . ", Military Medicine, Oct. 2013, vol. 178.

Aligned Management Associates, Inc., Corporate home page describing organizing committee, overview, Procedicus MIST[trademark]-suturing module 30.0, 6 pgs., obtained from website Sep. 6, 2004.

American Academy of Emergency Medicine, conference: 11th annual scientific assembly preconference ultrasound courts, http://www.aaem.org/education/scientificassembly/sa05/precon/ultrasound.shtml, 6 pgs, obtained from website Feb. 16, 2005.

Barbosa, J. et. al., "Computer education in emergency medicine residency programs," http://www.med-ed-online.org/res00002.htm, 8 pgs, obtained from website Sep. 6, 2004.

Brannam, Let al, "Emergency nurses' utilization of ultrasound guidance for placement of peripheral intravenous lines in difficult-access patients," Acad Emerg Med, 11(12):1361-1363, Dec. 2004.

Calvert, N et al., "The effectiveness and cost-effectiveness of ultrasound locating devices for central venous access: a systematic review and economic evaluation/executive summary," Health Tech Assess 2003, 7(12), 4 pgs.

(56) References Cited

OTHER PUBLICATIONS

Center for Human Simulation, corporate home page describing overview/people, http://www.uchsc.edu, 7 pgs, obtained from website Sep. 6, 2004.
CIMIT News, "The medical access program: new CIMIT initiative to benefit underserved patients/partners telemedicine and CIMIT launch new initiative: stay connected, be healthy/highlights: operating room of the future plug-and-play project," http://www.cimit.org, Jan. 2005: vol. II(2), 2 pgs., obtained from website Mar. 1, 2005.
Colt, H. G. et. al., "Virtual reality bronchoscopy simulation: a revolution in procedural training," Chest 2001; 120:1333-1339.
Computer Motion, "About computer motion: technology to enhance surgeons' capabilities, improve patient outcomes and reduce healthcare costs/corporate alliances/products & solutions for surgical innovation/training on the da Vinci[registered] surgical system-introd action," 2002 Computer Motion, http://www.computermotion.com, 6 pgs.
Delp, Setal, "Surgical simulation—an emerging technology for training in emergency medicine," Presence, 6(2):147-159, Apr. 1997 (abstract).
Dorner, R. et. al,, "Synergies between interactive training simulations and digital storytelling: a component-based framework," Computer & Graphics, 26(1):45-55, Feb. 2002 (abstract).
Duque, D. and Kessler S., "Ultrasound guided vascular access," Amer Coli Emerg Phy., http://www.nyacep.org/education/articles/ultrasound%20vascular%20access.htm, 2 pgs, obtained from website May 11, 2005.
Espinet, A. and Dunning J., "Does ultrasound-guided central line insertion reduce complications and time to placement in elective patients undergoing cardiac surgery," Inter Cardiovascular Thoracic Surg, 3:523-527, 2004; http:/licvts.ctsnetjournals.org/cgi/content/full/3/3/523, 6 pgs, obtained from website May 11, 2005 (abstract).
Gallagher, A. G. et. al., "Virtual reality training for the operating room and cardiac catheterization laboratory," Lancet, 364:1538-1540, Oct. 23, 2004.
Gallagher, A. G. et. al., "Psychomotor skills assessment in practicing surgeons experienced in performing advanced laparoscopic procedures," AM Coll Surg, 197(3):479-488, Sep. 2003.
Gausche, M. et. al., "Effect on out-of-hospital pediatric endotracheal intubation on survival and neurological outcome: a controlled clinical trial," JAMA, 283(6):783-790, Feb. 9, 2000.
Gore, D. C. and Gregory, S. R., "Historical perspective on medical errors: Richard Cabot and the Institute of Medicine," J Amer Coll Surg, 197(4), 5 pgs, Oct. 2003.
Grantcharov, T. P. et. al., "Randomized clinical trial of virtual reality simulation for laparoscopic skills training," Br J Surg, 91(2):146-150, Feb. 1, 2004 (abstract).
Grantcharov, T. P. et. al., "Learning curves and impact of previous operative experience on performance on a virtual reality simulator to test laparoscopic surgical skills," Am J Surg, 185(2):146-149, Feb. 1, 2004 (abstract).
Haluck, R. S., et. al., "Are surgery training programs ready for virtual reality? A survey of program directors in general surgery," Arch Surg, 135(7):786-792, Jul. 1, 2000.
Helmreich, R. L., "On error management: lessons from aviation," BMJ, 320:781-785, Mar. 2000.
Huckman, R. S. and Pisano, G. P., "Turf battles in coronary revascularization," N Engl J Med, http://www.nejm.org, 4 pgs, 352(9):857-859, Mar. 3, 2005.
Immersion Corporation, URL: http://www.immersion.com/corporate/products/, corporate home page describing Immersion's surgical training simulators—"Wireless Data Giove: The CyberGlove[registered]II System," 5 pgs, obtained from the website Nov. 17, 2005 and Jan. 24, 2008.
injuryboard.com, "Reducing complications associated with central vein catheterization," URSL: http://www.injuryboard.com/view.cfm/Article=668, 5 pgs, obtained from website May 11, 2005.
Intersense, home page listing motion tracking products, http://www.isense.com/prodcuts.aspx?id=42&, 1 pg, obtained from website Jan. 24, 2008.
Jemmett, M. E., et. al., "Unrecognized misplacement of endotracheal tubes in a mixed urban to rural emergency medical services setting," Acad Emerg Med, 10(9):961-964, Sep. 2003.
Katz, S. H. and Falk, J. L., "Misplaced endotrachial tubes by paramedics in an urban medical services system," Annals Emerg Med, 37:32-37, Jan. 2001.
Lewis, R., "Educational research: time to reach the bar, not lower it," Acad Emerg Med, 12(3):2478-248, Mar. 2005.
Liu, A. et. al., "A survey of surgical simulation: applications, technology, and education," Presence, 12(6):1-45, Dec. 2003.
Manchester Visulations Centre, "Webset project-bringing 3D medical training tools to the WWW," http://www.sve.man.ac.uklmvc/research/previous/website, 3 pgs, obtained from the website Sep. 8, 2004.
Medical Simulation Corporation, corporate home page describing management team/frequently asked questions, http://www.medsimulation.com/about_msc/key_employees.asp, 7 pgs, obtained from website Nov. 25, 2004.
Medtronic, "The StealthStation[registered] treatment, guidance system," the corporate home page describing the company fact sheet and profile; http://www.medtronic.com/Newsroom, 4 pgs, obtained from website Mar. 5, 2005.
Mort, T. C., "Emergency tracheal intubation: complications associated with repeated laryngoscopic attempts," Anesth Analg, 99(2):607-613, Aug. 2004, 1 pg, obtained from website Sep. 8, 2004 (abstract).
Nazeer, S. R., et. al., "Ultrasound-assisted paracentesis performed by emergency physicians v.s. the traditional technique: a prospective, randomized study," Amer J of Emer Med, 23:363-367, 2005.
NCA Medical Simulation Center, Tutorial-simulation for medical training, http://Simcen.usuhs.millmiccaie, 4 pgs, 2003.
Next Dimension Imaging, "Products-Anatomy Analyzer 2," http://www.nexted.com/anatomyanalyzer.asp, 2 pgs, obtained from website Dec. 7, 2004.
Norris, T. E. et. al., "Teaching procedural skills," J General internal Med, 12(S2):S64-S70, Apr. 1997.
On the Net Resources-Education and Training, URL: http://www.hitl.washington.edu/projects/knowledge_base/education.html, corporate home page regarding internet sites regarding education and training, 16 pgs, obtained from website Jan. 8, 2005.
Osberg, K. M., "Virtual reality and education: a look at both sides of the sword," http://www.hitl.washington.edu/publications/r-93-7/, 19 pgs, Dec. 14, 1992, obtained from website Jan. 21, 2008.
Osmon, S. et. al., "Clinical investigations: reporting of medical errors: an intensive care unit experience," Grit Care Med, 32(3), 13 pgs, Mar. 2004.
Ponder, M., et al., "Immersive VR decision training: telling interactive stories featuring advanced human simulation technologies," Eurographics Association 2003, 10 pgs.
Prystowsky, J. B. et. al., "A virtual reaiity moduie fer intravenous catheter placement," Am J Surg 1999; 17(2):171-175 (abstract).
Reachin, "Medical Training Development Centre/Reachin technologies AB has entered into a corporation with Mentice AB," Jan. 20, 2004, 4 pgs, obtained from website Nov. 9, 2004.
Rothschild, J. M., "Ultrasound guidance of central vein catheterization," NCBI, Nat Lib Med, www.ncbi.nlm.nih.gov/books/, HSTAT 21, 6 pgs, obtained from website May 11, 2005.
Rowe, R. and Cohen, R. A., "An evaluation of a virtual reality airway simulator," Anesth Analg 2002, 95:62-66.
Sensable Technologies, "PHANTOM Omni Haptic Device," 2 pgs, http://www.sensable.com/haptic-ohantom-omni.htm., obtained from website Jan. 24, 2008.
Shaffer, K., "Becoming a physician: teaching anatomy in a digital age," NEJM, Sep. 23, 2004; 351(13):1279-81 (extract of first 100 words—no abstract).

* cited by examiner

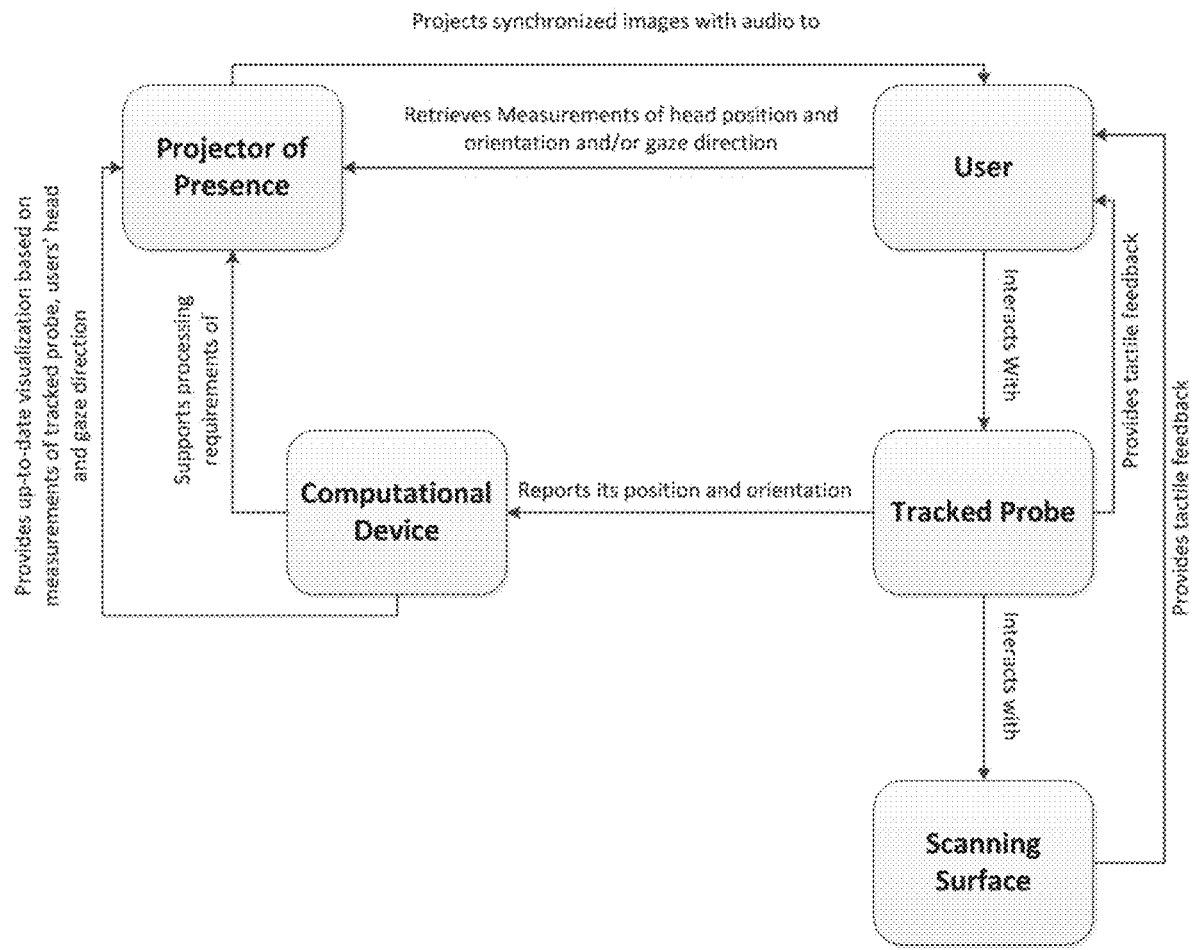

SYSTEM AND METHOD FOR MULTISENSORY PSYCHOMOTOR SKILL TRAINING

CROSS REFERENCE TO RELATED APPLICATIONS

This application is a continuation of U.S. patent application Ser. No. 15/880,290, filed Jan. 25, 2018, titled "System and Method for Multisensory Psychomotor Skill Training," which claims the benefit of U.S. Provisional Patent Application No. 62/450,975, filed Jan. 26, 2017, which applications are incorporated here in their entirety by this reference.

TECHNICAL FIELD

This invention relates generally to systems and methods for providing medical training, and more specifically to medical training systems and methods that at least partly involve simulations of medical procedures and operations, particularly ultrasonography.

BACKGROUND

Paradigm shifts are taking place in the world of medicine and technology. Point-of-care ultrasonography is redefining the very essence of the physical examination and the way clinicians practice medicine. Point-of-care ultrasound refers to the use of portable ultrasonography at a patient's bedside for diagnostic (e.g., symptom or sign-based examination) and therapeutic (e.g., image-guidance) purposes. The principal barrier to use of this life-saving technology is lack of ultrasound training. User adoption is limited by the psychomotor skills required to manipulate an ultrasound probe coupled with the ability to interpret the resulting ultrasound images. Concurrent with improving psychomotor skills, training must also reflect the psychosocial stressors associated with performing procedures. It is clear that medical education must catch up with the expanded use of ultrasonography if tomorrow's practitioners are to provide superior healthcare for their patients.

Developing competence on performing ultrasonography in a clinical setting requires integrated cognitive (image interpretation) and psychomotor (optimal image window acquisition) skills and developing the ability to perform these procedures under stress. Once an optimal image window is acquired and correctly interpreted, the information needs to be correctly applied to patient care. The opportunity cost of training healthcare providers on ultrasonography is extremely high. Optimal training requires: (1) a qualified instructor; (2) trainees; (3) an ultrasound machine; (4) a patient with a pathologic condition; and (5) an environment that accurately recreates the psychosocial challenges of performing procedures. All of these elements must come together in the same place and at the same time.

Currently available training methods all have significant limitations. These include clinical bedside teaching, attending hands-on training courses, use of phantom models, and high-fidelity yet very expensive ultrasound simulator workstations. They may involve bulky training platforms that require multiple users to visit a simulation center (e.g., UltraSim®, CAE Healthcare) or require the presence of an actual ultrasound machine (e.g., Blue Phantom™). These ultrasound-training solutions employ high-priced dedicated computer hardware and software that does not deploy over the Internet. Alternative training products provide a limited library of purely didactic training solutions that are not accompanied with any hands-on training experience (e.g., EMSONO). None of the above solutions recreate the psychosocial stressors of performing procedures in a real-life clinical setting.

Conversely, within the fields of virtual reality, augmented reality, and mixed reality technologies there exists the ability to create virtual (digital) characters, environments, and guides that can be superimposed on actual physical objects. However, none of these technologies offer the ability to develop and train individuals on highly refined psychomotor skills, such as performing an ultrasound-guided procedure.

For the foregoing reasons there is a need for a system and method to develop psychomotor skills of individuals on a wide variety of tasks, such as ultrasound-guided procedures, in a context (or clinical setting) that accurately imposes the psychosocial stressors of performing these stated procedures in a real clinical setting. Individuals skilled in these arts and technologies have not been able to devise a solution to the described limitations of existing training solutions. The lack of existing products and/or technology solutions to this problem, at the time of this filing, speaks to the lack of a clear and/or obvious solution to this problem.

SUMMARY

The present invention is directed to creating the perception of presence in a multisensory psychomotor skill training environment that would extend the existing described patented technologies by further adding realism through representation of virtual (digital) characters into a training scenario (e.g., pregnant patient), superimposing virtual (digital) guides or prompts onto actual real physical objects (e.g., anatomical landmarks or guides onto a mannequin or patient), or embedding the training instruments within a broader virtual (digital) scenario (e.g., operating room).

BRIEF DESCRIPTION OF DRAWINGS

FIG. 1 shows a schematic flow diagram illustrating how the various components of the system of the present invention may interact.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The present invention is a system and method for delivering psychomotor skill training to provide didactic instruction for performing a skill in at least a partially virtual environment. In some embodiments, using an internet portal, tracking performance, and providing user feedback within a multisensory environment integrates existing multimodal ultrasound training systems with the psychomotor skill training system. The feedback may be in the form of an auditory feedback, visual feedback, or tactile feedback to alert or instruct the user regarding his or her performance.

The existing multimodal ultrasound training systems comprise a wide variety of immersive and non-immersive visualization technologies that have been described as virtual reality, augmented reality, and mixed reality. U.S. Pat. No. 8,480,404 to Savitsky (the '404 patent) and U.S. Pat. No. 8,297,983 to Savitsky et al. (the '983 patent) describe multimodal ultrasound training systems in greater detail. The '404 and '983 patents are incorporated in their entirety here by this reference.

The '404 patent teaches a medical procedure training system based on a computer platform that provides multimodal education within a virtual environment. The system integrates digital video, three-dimensional modeling, and force-feedback devices for the purpose of training medical professionals on the skills required to perform medical procedures. It can be used to teach a variety of medical procedures and interventions, including ultrasound. The '983 patent describes an ultrasound training system having a data capture module, a digital asset management module, a validation module, didactic content, a media asset production module, an integration layer, an internet-based portal, a software client, and a peripheral probe. The combination of the disclosed elements creates a system that enables the creation and delivery of high-quality ultrasound education and training in a low-cost, widely deployable, and scalable manner, with a facilitated method for processing orders and financial transactions between customers and content providers.

The multisensory psychomotor skill training environment of the present invention would extend the existing described patented technologies by further adding realism through representation of virtual (digital) characters into a training scenario (e.g., pregnant patient), superimposing virtual (digital) guides or prompts onto actual real physical objects (e.g., anatomical landmarks or guides onto a mannequin or patient), or embedding the training instruments within a broader virtual (digital) scenario (e.g., operating room). The ability to create these virtual, augmented, and mixed reality scenarios enables cost-effective, realistic, and improved training capabilities that mirror real-life training scenarios.

Importantly, the present invention would eliminate the need for physical structures (e.g., hospital beds, manikins, etc.) within the training scenario, as these elements can be virtually represented—making training scalable, cost-effective, and efficient. Combining the virtual, augmented, and mixed reality scenarios with the multimodal ultrasound training system enables effective ultrasound training for performance of fine psychomotor skill-dependent skills with the added psychosocial stressors associated with performing these procedures in real clinical settings. This proposed system and method for providing multisensory psychomotor skill training will address the unmet need for a method to develop the psychomotor skills of individuals on a wide variety of tasks, such as ultrasound-guided procedures, in in a realistic clinical scenario with proportionate psychosocial stressors.

The present invention hinges on emerging technologies capable of creating the perception of presence to enhance the psychological impact and the effectiveness of medical training simulators. The notion of presence for our purpose has two fundamental meanings:

(1) the cognitive illusion of being truly transported into an alternate world recreated by computer simulations; or (2) the cognitive illusion that an object, a person, or other interactive medium generated by computer simulations is truly present in the surrounding world perceived by the user.

The notion of presence is fundamentally important in its ability to instill a powerful emotional response in users—an essential requisite for our invention. Collectively, these technologies are defined as projector of presence ("POP") devices. The POP devices address the problem associated with recreating the visual and auditory stimuli that play a primary role in creating the perception of presence and synchronizing those stimuli with the reality that surrounds the user. A practitioner skilled in the art will recognize that several commercially available POP devices exist already. POP devices are grouped in several broad categories:

(1) Virtual Reality (VR), wherein the sight of the real world is entirely blocked by an opaque medium and the user's field of view is completely replaced by a rendering of a simulated reality (virtual world) in which solutions generally rely on sophisticated motion sensing technologies to synchronize the rendering of the virtual world with the user's head motion and in some cases his or her position in the real world;

(2) Augmented Reality (AR), wherein the content is overlaid on the user's field of view of the real world and enhanced with audio that responds to the surrounding real world in which true AR solutions are generally restricted to showing notifications or graphical user interfaces superimposed on real objects; or (3) Mixed Reality (MR), wherein solutions extend the basic notion of AR by synchronizing the content overlaid onto the user's field of view with the surrounding real world, thus recreating a convincing perception that the simulated objects are really present in front of the user.

While the present invention can be realized with any of these categories of POP devices, the preferred embodiment utilizes VR and MR for their enhanced ability in creating the perception of presence. Further, it has been shown that for many applications, tactile feedback is also very important in establishing a strong perception of presence, especially in situations where a simulated real world task does in fact require interaction with a physical object. The present invention conveys the strongest perception of presence and succeeds in recreating psychological stressors that occur in real-world clinical scenarios.

Unless otherwise stated, the following terms as used herein have the following definitions.

"Projector of Presence" of "POP" devices refers to any VR, AR, or MR device capable of measuring key aspect of the user's head position, body placement, and gaze direction using a first set of sensors to measure position, orientation, and/or motion in order to project realistic renditions of individual objects or entire settings into the user's field of view. These types of technologies exist already and are rapidly evolving.

"Tracked probe" refers to a device preferably in the shape of a medical instrument with a second set of sensors to measure its position, orientation and/or motion, and with communication hardware to transmit sensor information to the computer.

"Scanning surface" refers to a planar or curvilinear solid surface on which the user can place and move the tracked probe on top of, such as a medical manikin. Preferably the geometry of the scanning surface is known by the simulation software so that the tactile feedback of the tracked probe moving on the scanning surface can be reproduced accurately in the virtual environment projected by the POP device. The scanning surface may contain a third set of sensors so that its position, orientation, and/or motion can be measured and detected.

The sensors for detecting position, orientation, and/or motion can be realized using MEMS sensors, such as accelerometers, gyroscopes, and magnetometers for self-contained solutions, or the can be built using external optical or electromagnetic trackers that act as position and orientation references. Other sensing solutions capable of measuring position, orientation and/or motion fall within the spirit of this invention.

A "computer" refers to any type of desktop, laptop, tablet, mobile computer, or any other computational device capable of running the simulation software and/or communicating through a wired or wireless connection with the POP device and tracked probe.

A "simulation software," runs on the computer and provides a realistic representation of a clinical scenario to train students on the use of medical imaging and how to perform certain types of procedures. Several types of simulation solutions exist on the market and demonstrate the importance of this type of technology. However, current solutions are not capable of instilling the same types of psychosocial stressors that a medical practitioner encounters in real life or emulating interactions with other medical professionals involved in a clinical scenario (e.g. nurses and radiologists).

The simulation software augmented with a POP device renders and animates a clinical scene and provides a convincing rendition of a patient in pain that emotes vigorously during a procedure. The simulation software also renders and animates other medical professionals interacting and talking to the user to help him or her understand the team effort required to diagnose and treat a patient in real life and to emulate the psychological pressure of being surrounded by other individuals that must coordinates their efforts to achieve a desired clinical goal. The computer monitors the position, orientation, and movement of the tracked probe to determine whether the user has performed the proper procedure with a predetermined level of proficiency by determining whether the tracked probe was in the correct position and orientation and moved in a predetermined manner within a specified tolerance level for a given scenario.

As illustrated in FIG. 1, the present invention, in the preferred embodiment, comprises a POP device, a tracked probe emulating a medical implement whose orientation and/or position can be tracked in 3D space, an optional scanning surface that emulates the physicality of a human body or a section of it, a computer capable of running the simulation, and software running on the computer that gathers data from the various devices comprising this invention and actuates them based on the state of the simulation.

In use, a user wears and activates a POP device. A computer in communication with the POP device generates a simulation in the user's field of view. The simulation may be all the user sees in the user's field of view or the simulation may be integrated with the real world environment in the user's field of view. The user holds a tracked probe in the user's hand, and when brought into the user's field of view, the tracked probe enters the simulation. As the tracked probe interacts with the simulation, the tracked probe provides tactile feedback that contributes to a perception of the user.

In some embodiments, the tracked probe may be used with a scanning surface. The tracked probe interacts with the scanning surface and the combined interaction provides a tactile feedback that contributes to the perception of the user.

In some embodiments, the computer in communication with the POP device and the tracked probe determines the position and orientation of the tracked probe and the POP device and projects a simulated environment on the POP device based on the position and orientation of the POP device and the tracked probe. The POP device uses the sensors to measure information, such as the orientation and/or position of the user's head and gaze direction, and reports the information to the computer.

The computer may be integrated with the POP device or may be a separate system that communicates with the POP device and supports the processing requirements of the POP device. The computational system uses the information to generate a rendering of a simulated scene in the POP device for display in the user's field of view. The simulated scene may represent a clinical scenario or individual objects in a way that matches the user's viewpoint and the current state of the tracked probe.

The POP device renders an image, and optionally auditory feedback, to convince the user that the simulated scene generated by the computer simulation is truly present in the user's field of view. By way of example only, in an ultrasound training application, the POP device may present a simulated hospital scene in which the tracked probe is represented as an ultrasound probe. The scanning surface may be presented as a patient. As the user looks around the room, the POP device generates a simulated monitor when the user looks in a specific location. The specific location may be predetermined, or the user may select a particular location to generate the simulated monitor. The user can then begin his or her ultrasound examination on the scanning surface. If the user's gaze is directed towards the tracked probe and scanning surface, then the user will see the ultrasound probe and patient. If the user turn's his or her head in the particular location where the monitor was established, then the user sees on the simulated monitor, an ultrasound image. As the user manipulates the ultrasound image along the scanning surface, the ultrasound image changes accordingly giving the user the perception of actually conducting an ultrasound scan.

The simulation software can create a scene in which the user must perform the proper procedure to pass the test. Whether the user passes the test will be determined by the position, orientation, and/or movement of the tracked probe. Timing can also be integrated into the scene by allowing the user to perform a particular procedure at a specified time that the user must recognize. Distractions can also be incorporated into the scene to determine whether the user is able to maintain focus.

A database of scenes may be stored on the computer or other storage device for the user to select to test various skills and knowledge.

The system can take the form of an entirely hardware embodiment, an entirely software embodiment or an embodiment containing both hardware and software elements. In one embodiment, the system is implemented in software, which includes but is not limited to firmware, resident software, microcode, etc.

Furthermore, the system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. The internet can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize analog telephone lines, digital T-1 lines, T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A system for medical training, comprising:
a) a POP device configured to register a position and orientation of the POP device with a computer using a first set of sensors;
b) a probe configured to register a position and orientation of the probe with the computer using a second set of sensors;
c) a scanning surface configured to register a position and orientation of the scanning surface with the computer using a third set of sensors; and
d) the computer configured to monitor the position and orientation of the POP device, the position and orientation of the probe, and the position and orientation of the scanning surface;
e) the computer programmed with a simulation software that when executed:
   i) generates a simulated environment in the POP device representing a clinical scenario in a manner that corresponds with a user's gaze direction;
   ii) generates a virtual medical instrument based on the position and orientation of the probe; and
   iii) generates a virtual patient based on the position and orientation of the scanning surface.

2. The system of claim 1, wherein the computer is configured to provide feedback to the user.

3. The system of claim 2, wherein the feedback is audio feedback through the POP device.

4. The system of claim 2, wherein the feedback is visual feedback through the POP device.

5. The system of claim 1, wherein the probe is configured to generate tactile feedback corresponding with a scene in the simulated environment.

6. The system of claim 1, wherein the simulation software is configured to animate a clinical scene and the computer is configured to determine a level of proficiency of the user by determining whether the probe was in a correct position and orientation, and moved in a predetermined manner within a specified tolerance level.

7. The system of claim 1, wherein the computer is configured to track a performance of the user.

8. The system of claim 1, wherein the POP device is selected from the group consisting of a virtual reality device, an augmented reality device, and a mixed reality device.

9. A method for medical training, comprising the steps of:
a) a POP device registering a position and orientation of the POP device with a computer;
b) a probe registering a position and orientation of the probe with the computer;
c) a scanning surface registering a position and orientation of the scanning surface with the computer;
d) the computer monitoring the position and orientation of the POP device, the position and orientation of the probe, and the position and orientation of the scanning surface;
e) the computer programmed with simulation software that when executed:
   i) generates a simulated environment in the POP device representing a clinical scenario in a manner that corresponds with the position and orientation of the POP device;
   ii) generates a virtual medical instrument based on the position and orientation of the probe; and
   iii) generates a virtual patient based on the position and orientation of the scanning surface.

10. The method of claim 9, wherein the computer provides feedback to the user.

11. The method of claim 10, wherein the feedback is audio feedback through the POP device.

12. The method of claim 10, wherein the feedback is visual feedback through the POP device.

13. The method of claim 10, wherein the probe generates tactile feedback corresponding with a scene in the simulated environment.

14. The method of claim 13, wherein the simulation software animates a clinical scene and the computer determines a level of proficiency of the user by determining whether the probe was in a correct position and orientation, and moved in a predetermined manner within a specified tolerance level.

15. The method of claim 14, wherein the computer tracks a performance of the user.

16. The method of claim 15, wherein the POP device is selected from the group consisting of a virtual reality device, an augmented reality device, and a mixed reality device.

17. A method for medical training, comprising the steps of:
   a) displaying at least a partially simulated environment in a POP device based on a position and orientation of the POP device;
   b) displaying a virtual medical instrument in the at least partially simulated environment based on a position and orientation of a probe when the POP device is directed towards the probe;
   c) displaying a virtual patient in the at least partially simulated environment based on a position and orientation of a scanning surface when the POP device is directed towards the scanning surface; and
   d) displaying a simulated monitor in the at least partially simulated environment when the POP device is directed towards a predetermined location.

18. The method of claim 17, further comprising generating tactile feedback to the probe while the probe is moved along the scanning surface.

19. The method of claim 18, displaying an ultrasound image in the simulated monitor corresponding to the position and orientation of the probe relative to the position and orientation of the scanning surface when the POP device is directed towards the predetermined location.

* * * * *